(No Model.)

J. BEAUPIED.
CAR WHEEL AND AXLE.

No. 291,274. Patented Jan. 1, 1884.

Witnesses:
E. E. Massow
L. E. Hills

Inventor:
Joseph Beaupied

UNITED STATES PATENT OFFICE.

JOSEPH BEAUPIED, OF SAN JUAN, PORTO RICO, WEST INDIES.

CAR WHEEL AND AXLE.

SPECIFICATION forming part of Letters Patent No. 291,274, dated January 1, 1884.

Application filed January 27, 1883. (No model.)

*To all whom it may concern:*

Be it known that I, JOSEPH BEAUPIED, a citizen of the Republic of France, residing at San Juan, Porto Rico, West India Islands, have invented certain new and useful Improvements in Car Wheels and Axles, of which the following is a specification.

My invention relates to improvements in car wheels and axles in which one of the wheels is fast upon one end of the axle and the other is free to revolve upon the other end; and the objects of my improvement are to obtain all the advantages resulting from having a fast and a loose wheel upon the same axle, by utilizing the axles and the wheels already in use, and accomplishing the above result (obtained by a loose wheel) by simple and inexpensive means. I accomplish these objects by the construction illustrated in the accompanying drawings, in which—

Figure 1:
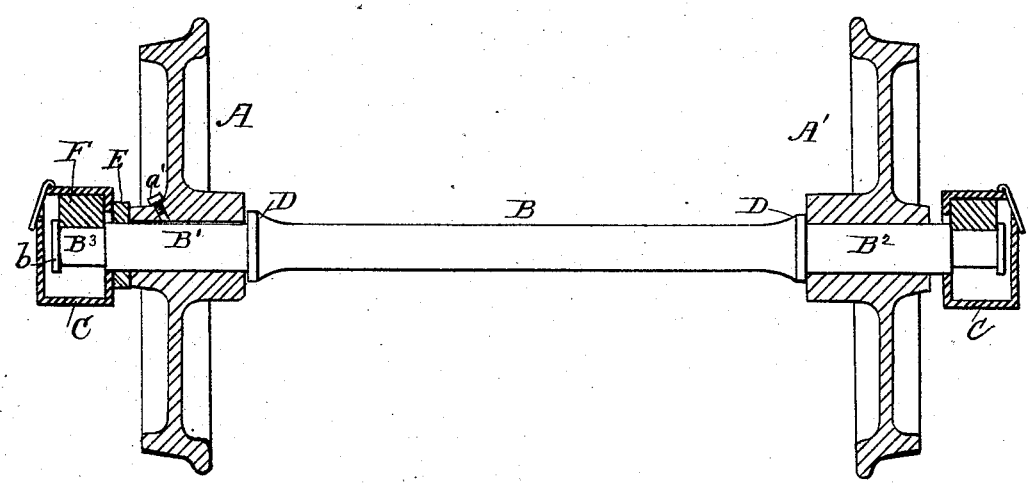
Figure 2:
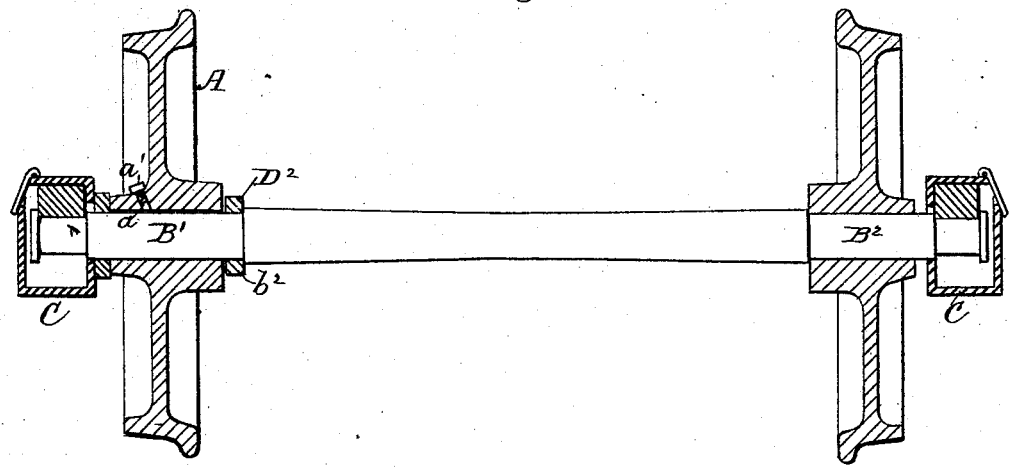

Figure 1 is a cross-sectional elevation of two railway-car wheels having hubs of same form mounted upon an axle according to my improved method. Fig. 2 is a cross-sectional elevation of two railway-car wheels connected according to my invention to an axle of slightly modified form.

It is well known that heretofore the axles of railway-cars have been provided at one end with one wheel secured rigidly thereto by means of keys, screws, or heavy hydraulic pressure, while the other wheel has been connected thereto by means of cumbersome sleeves, collars, clamps, &c., that greatly increase the weight of the loose wheel. This increase of weight increases the momentum while running, and with every addition of speed in a train there is a tendency for this loaded loose wheel to gain upon its mate and cause either wheel to leave the track.

The advantages to be gained in reducing the friction of the wheels against the curves of railway-tracks by having one of the wheels loose upon the axles are well known, and that wheels of this character have not been adopted to any great extent is partly due to the defects above stated, which have been remedied by my present construction.

Referring to the accompanying drawings, the railroad-car wheel A' is of usual construction, and is made fast upon one end of the axle B by forcing it thereon by hydraulic pressure or other well-known means. The wheel A is similar in form and weight to the wheel A', but is mounted loosely upon the portion B' of the axle by having said portion turned off slightly smaller in diameter then the corresponding portion, B², receiving the fast wheel A'. Adjoining the inner end of the hub of the wheel A, (and also of the wheel A',) the axle is provided with a collar, D, forged thereon, to receive the inner thrust of the wheel, while there is placed upon the axle, between the outer end of the hub and the journal-box C, a washer, E, to limit the longitudinal motion of the wheel in that direction. Although I prefer to use the washer E, it might be dispensed with in using new axles, and the wheel-hub made to abut against the side of the journal-box C. Within this box C is placed the axle-bearing F, fitting the journal B³ of the axle. The axle is retained in position, as well as the loose wheel A thereon, by the axle-bearing F resting upon its journal between the end of the portion B' of the axle and the collar $b$ at the end of the said axle. If the wheel A is to be mounted loosely on an old axle unprovided with collars D, the diameter of the axle is reduced at the end B', intended to receive the wheel B loosely thereon, and at the same time form a shoulder, $b^2$ against which a collar, D², is placed, to receive the side thrust of the wheel A; otherwise the parts correspond in form with those in Fig. 1. Within the hub of the wheel A an oil-hole, $a$, is made, that is closed by a screw-plug, $a'$. But very little oil is required, as said wheel rotates upon the portion B' of the axle only when passing curved portions of the track.

As above stated, I am aware that it is not new to use two loose wheels on the same axle, or to arrange a loose wheel of peculiar construction and connect it by means of a flange and cap-plate with the axle, or to provide the axle with an additional collar; but

What I claim as new and of my invention is—

The combination of the axle provided with the collar D at each end, a journal, B', for one of the wheels, of slightly less diameter than the bearing B² for the other wheel, and a collar, E, for retaining the loose wheel in position upon the axle, with journal-box C and wheels A A', constructed alike, substantially as and for the purpose described.

JOSEPH BEAUPIED.

Witnesses:
E. E. MASSON,
L. C. HILLS.